Figure 1:
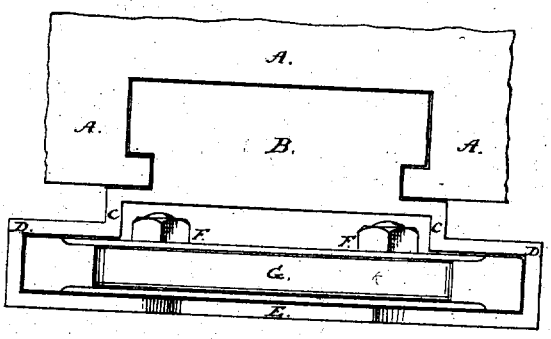

J. H. VINTON,

Assignor to F. ARMSTRONG.

Screw-Cutting Dies.

No. 8,910. Reissued Sept. 30, 1879.

Witnesses,
F. W. Howard
M Gardner

John H. Vinton Inventor,
By Atty Wm C. R. W. Fritze

UNITED STATES PATENT OFFICE.

JOHN H. VINTON, OF BRIDGEPORT, CONNECTICUT, ASSIGNOR TO FRANK ARMSTRONG.

IMPROVEMENT IN SCREW-CUTTING DIES.

Specification forming part of Letters Patent No. 208,870, dated October 8, 1878; Reissue No. 8,910, dated September 30, 1879; application filed February 17, 1879.

*To all whom it may concern:*

Be it known that I, JOHN H. VINTON, of Bridgeport, in the county of Fairfield and State of Connecticut, have invented certain new and useful Improvements in Screw-Cutting Dies and Holders; and I do hereby declare that the following is a full and exact description thereof, reference being had to the accompanying drawings, making part of this specification.

My invention relates to certain improvements in the construction of screw-cutting dies and plates, and their application to pipe-cutting machines.

My invention has for its object to so form the cutting-dies that they shall cut off the excess of metal at the starting end, and at the same time lead the pipe or screw-blank in, thus avoiding the necessity of pointing or filing the article to be threaded; and it also has for its object to so form the plate and plate-holder that the former shall be firmly held in position, while the latter shall be capable of connection with pipe or screw cutting machines, as at present made, for the reception of solid dies.

Previous to my invention dies for cutting threads have usually been made solid, and in some cases in parts; but in all cases the threads in the dies have been tapped or cut of a uniform diameter throughout the entire thickness of the die, and in order to facilitate the entrance of the pipe or bolt to be threaded it has been necessary to cut away the initial portion of the thread on a taper, leaving practically at such points no cutting threads or teeth, but simply flat cutting-edges, which must shave off the excess of metal from the end of the pipe or blank to be threaded before the subsequent cutting-threads of the die can begin to cut or perform their operation.

By this construction great power is necessary to induce the flat cutting-edges to perform their work, and they do not serve to "lead" the material being operated upon to the cutting-threads.

One part of my invention is designed to overcome these disadvantages; and consists in cutting the threads of the die on two tapers, the enlarged or initial taper serving to grasp the pipe, remove the excess of metal, and lead the pipe to the threads of less taper, which latter cut the threads upon the end of the pipe, as will be hereinafter more fully explained.

Prior to my invention it has been customary to use solid or non-adjustable dies with pipe-cutting machines, and the heads of all such machines have been made and adapted to receive such dies, so that adjustable dies, which are necessarily longer than the solid dies, could not be fitted into the head of the machines.

Another feature of my invention relates to so forming the plate or die holder that it may be readily secured within a suitable independent head of greater length than the machine-head, and so forming the die-plate holder that it in turn may be readily attached to the standard machines as at present used; and my invention, therefore, consists in a die-plate for adjustable dies formed with lugs or extensions on each side of the die-adjusting screws, extending longitudinally beyond said screws, so that when placed in a rectangular holder the said lugs will hold the die-plate against turning, and at the same time protect the adjusting-screws against accidental movement.

My invention further consists of a die-box adapted to receive the die-plate, and also adapted to enter and be supported within the ordinary die-recess in the head of pipe-cutting machines.

In order that those skilled may make and use my invention, I will proceed to describe in detail the peculiarities of construction and operation, referring by letters to the accompanying drawings, in which—

Figure 2:
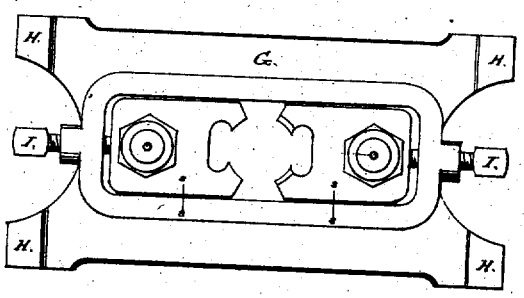
Figure 3:
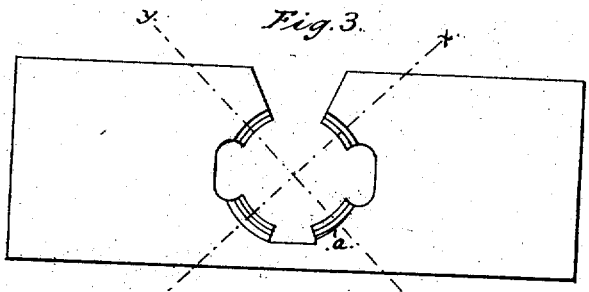
Figure 4:
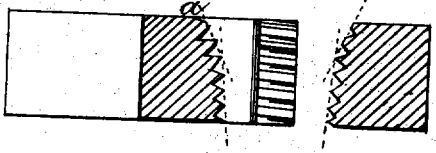
Figure 5:
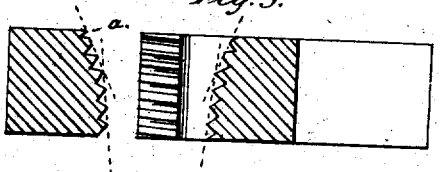

Figure 1 is a top or plan view of my invention as applied to the head of a pipe-cutting machine. Fig. 2 is a rear-side elevation of the dies and die-plate. Fig. 3 is a top or plan view of a die embodying my invention; and Figs. 4 and 5 are cross-sections at the lines *x x* and *y y*, respectively.

Similar letters indicate like parts in the several figures.

A represents the head of an ordinary pipe-cutting machine, formed with a rectangular vertical recess adapted to receive the ordinary solid dies, which are usually of the same size as said recess; but where smaller dies are used a rectangular box or bushing is sometimes employed.

B is my improved cast-iron box or die-plate holder, the rear portion of which is formed so as to enter the recess in the head of the machine. Projecting forward, it is extended laterally, as seen at C C, and again extended laterally, as seen at D D, then forward and returned toward the center, leaving a central opening, E, for the passage of the pipe. By this form and construction a recess is formed for the securing-nuts F of the die-plate, (which, in the manner of securing the dies adjustably, is preferably such as described in Letters Patent granted to Horace Griffing, dated April 6, 1875,) and a front recess is also formed for the reception of the die-plate G, the ends of which are projected to form lugs H, which, when the die-plate is in position, lie adjacent to and in the same plane with the ends of the box or receptacle. These lugs H, it will be seen, extend a distance not less than the length of the die-adjusting screws I, and any tendency of the die-plate to turn is prevented by the contact of said lugs with the box, while they at the same time protect the adjusting-screws against accidental movement.

It will be observed that by the peculiar formation of the box or receptacle B, dies and die-plates longer than the head of the standard machines may be used, and as the die-plate box or holder extends forward, a very short piece of pipe may be operated upon by the dies.

The thickness of the front of the box in a working machine being only about one-quarter of an inch, the pipe-holder may approach to within that distance of the first thread of the cutting-dies.

By reference to Figs. 4 and 5 of the drawings, it will be seen that the thread of the dies is of a uniform pitch throughout its whole extent, and that it is cut on two different tapers, as illustrated by the intersecting dotted lines, the initial or front portion of the thread having a greater taper than the remaining portion, the advantage of this construction being that the teeth or thread of greatest taper and diameter permit the introduction of the end of a pipe or bolt-bar, (which is usually enlarged or burred when being cut into sections,) and by reason of the increased diameter and fine or thread-like termination of the cutting-surface of the dies the pipe or bolt-blank is immediately grasped and led into the die. This construction enables the die to immediately grasp the pipe or blank, and, while cutting it, it at the same time leads it to the subsequent thread or cutter of less taper, which cuts it to the required gage, in contradistinction to the present double-taper die, which is simply a reduction of the height of the thread, producing a flat surface that shaves off the excess of metal on the pipe or blank before it can reach the actual thread-cutting portion of the die.

It is especially desirable that the die should have a double taper where the pipe upon which the threads are to be cut has a limited projection from its chuck or holder, as the greatest taper quickly embraces and removes the burr, while the smaller taper cuts the desired number of threads before coming in contact with the chuck or holder. In this respect it differs from a single or uniform taper die, whose length has to be increased in proportion to the diameter of the burr on the end of the pipe or blank.

By my improved form of cutting-thread I am also enabled to remove the excess of metal at the end of the pipe or blank with much less power, and when it is desirable to remove the pipe or screw from the cutter it is much sooner relieved from strain or pressure.

My improved dies are preferably formed by first making them in a single piece and completing the double-taper thread, and then subsequently cutting the die apart, in contradistinction to the present process, which consists in forming the regular taper, and then reaming out to form the increased taper or flare, and without retapping.

What I claim as new, and desire to secure by Letters Patent, is—

1. A screw-cutting die having the initial or starting end enlarged, as described, and provided with a leading-thread, as and for the purposes set forth.

2. The die-plate G, made of a single piece, and having its ends extended at the four corners beyond the planes occupied by the heads of the adjusting-screws to form lugs H, which shall serve to maintain the plate against movement when in a die-box, and at the same time guard the adjusting-screws against accidental movement, as hereinbefore set forth.

3. The die-box B, adapted to enter the die-recess in the head of a pipe-cutting machine, and extended forward and laterally to form a receptacle for a die and die-plate, substantially as hereinbefore set forth.

Witness my hand and seal this 14th day of February, A. D. 1879.

JOHN H. VINTON. [L. S.]

In presence of—

THEODORE COURTRIGHT,
WILLIAM O'MALLEY.